United States Patent [19]

Puryear et al.

[11] Patent Number: 4,905,930
[45] Date of Patent: Mar. 6, 1990

[54] BAIT CASTING FISHING REEL

[75] Inventors: John W. Puryear; Robert L. Carpenter; Lorens G. Hlava, all of Tulsa, Okla.

[73] Assignee: Zebco Corporation, Tulsa, Okla.

[21] Appl. No.: 110,684

[22] Filed: Oct. 20, 1987

Related U.S. Application Data

[62] Division of Ser. No. 757,521, Jul. 22, 1985, abandoned.

[51] Int. Cl.$^4$ .......................................... H01K 89/015
[52] U.S. Cl. ..................................... 242/312; 242/315
[58] Field of Search ..................... 242/84.1 R, 84.1 A, 242/84.1 F, 84.1 J, 84.1 K, 84.1 L, 84.1 M, 84.1 N, 84.4, 84.41, 84.42, 84.43, 217, 218, 219, 220, 221, 310, 312, 315

[56] References Cited

U.S. PATENT DOCUMENTS

| | | | |
|---|---|---|---|
| 820,609 | 5/1906 | Shakespeare | 242/84.1 R |
| 1,817,102 | 8/1931 | Russell | 242/84.42 |
| 2,232,253 | 2/1941 | Maynes | 242/84.1 R |
| 2,329,982 | 9/1943 | Coxe | 242/217 X |
| 2,388,979 | 11/1945 | King | 242/217 X |
| 3,670,985 | 6/1972 | Morishita | 242/84.43 |
| 4,056,246 | 11/1977 | Purcell | 242/219 |
| 4,133,499 | 1/1979 | Purcell | 242/217 |
| 4,575,024 | 3/1986 | Kaneko | 242/218 |

Primary Examiner—Joseph J. Hail, III
Attorney, Agent, or Firm—Wood, Dalton, Phillips, Mason & Rowe

[57] ABSTRACT

A casting type fishing reel is disclosed and includes a spool having a transverse spool shaft and a frame about the area of the spool. The frame includes a plurality of spacer posts joining a pair of side frame plates and inter-engaged to maintain the frame plates in conjoint alignment and to provide easy separation and assembly of the frame plates. A clutch mechanism is provided for selective actuation to move a spool pinion gear out of engagement with the spool shaft, and automatically re-engages the pinion gear in response to rotation of the reel handle. A magnetic drag mechanism is provided and recessed within a side cover of the reel. The reel handle, the main gear train of the reel and an anti-reverse ratchet-pawl mechanism all are mounted as a unitary assembly on a side cover for the reel whereby the cover can be removed from the reel for access to the gear train and other interior reel components without removing the handle. Bolt-like retainers extend transversely through the reel to maintain the reel in assembly, one of the bolt-like retainers forming a guide for a level wind mechanism of the reel.

2 Claims, 5 Drawing Sheets

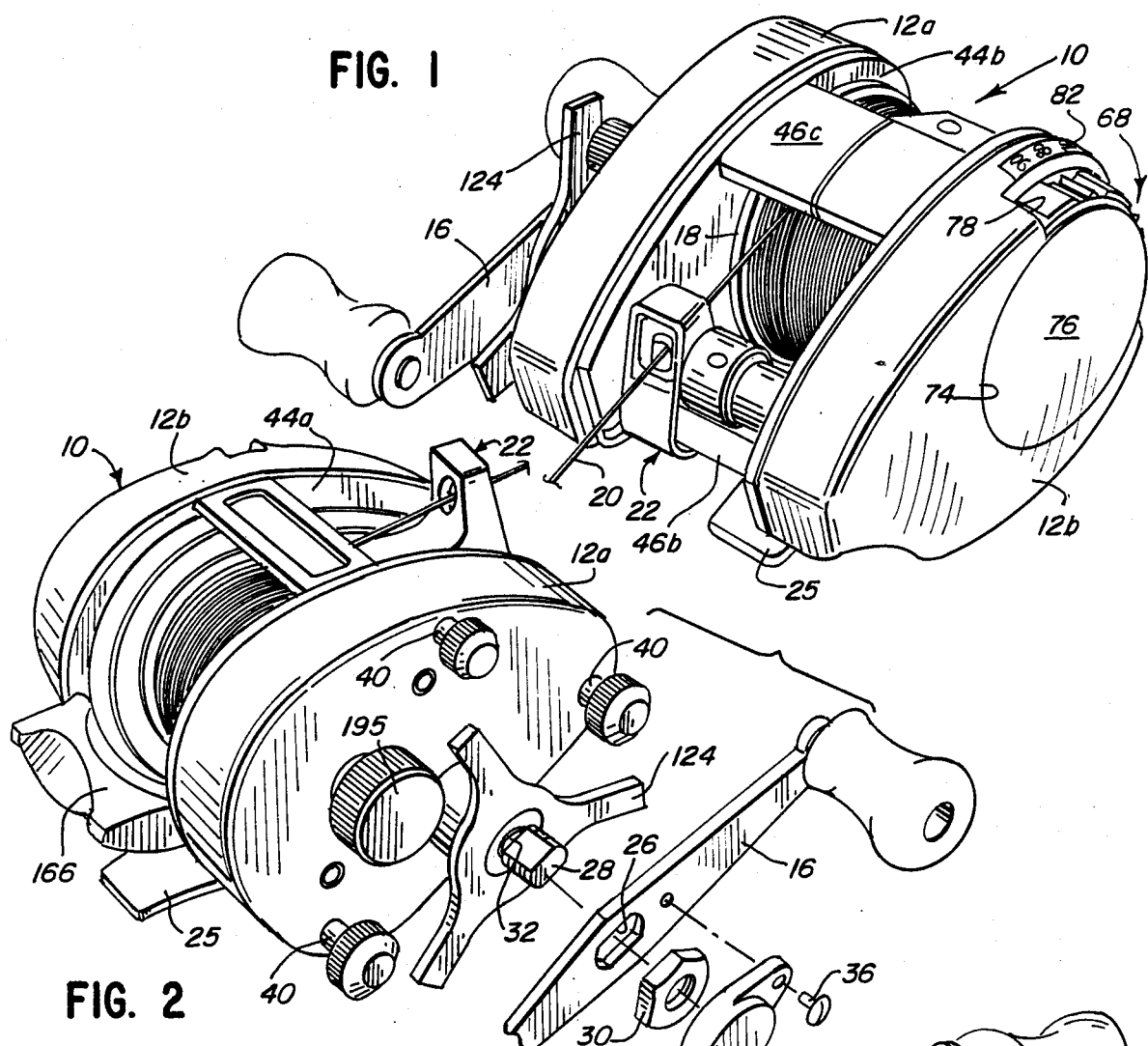
FIG. 1
FIG. 2
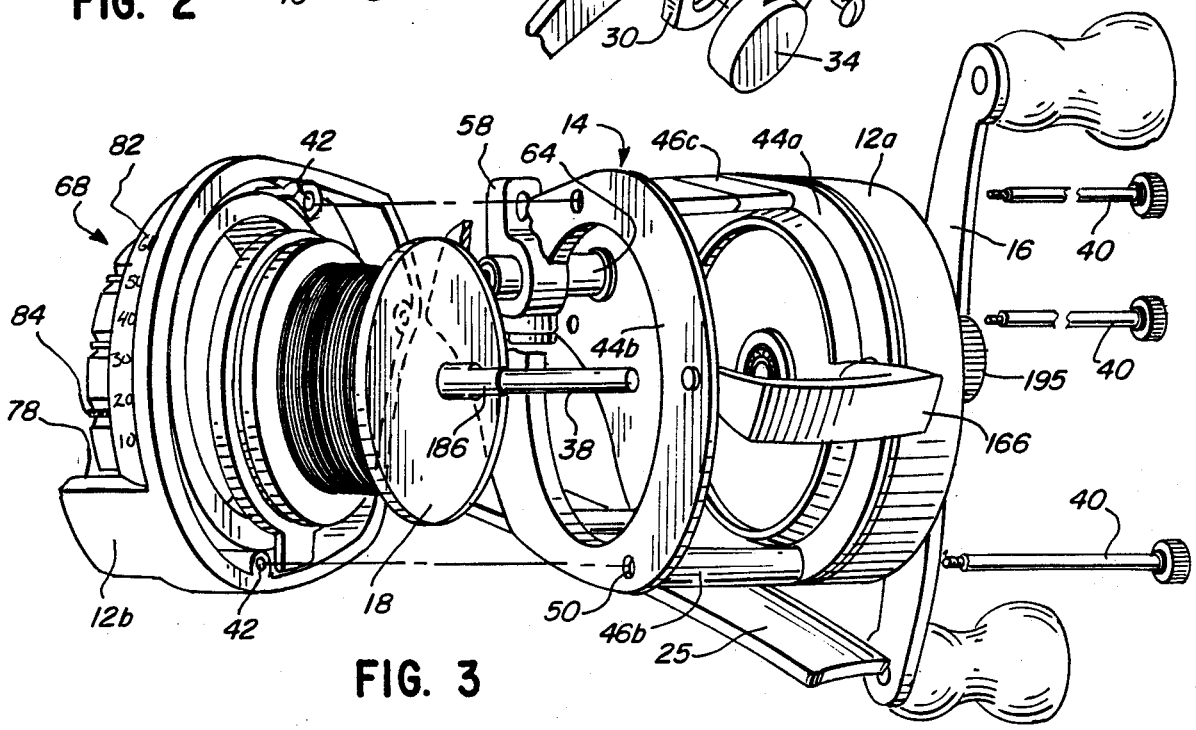
FIG. 3

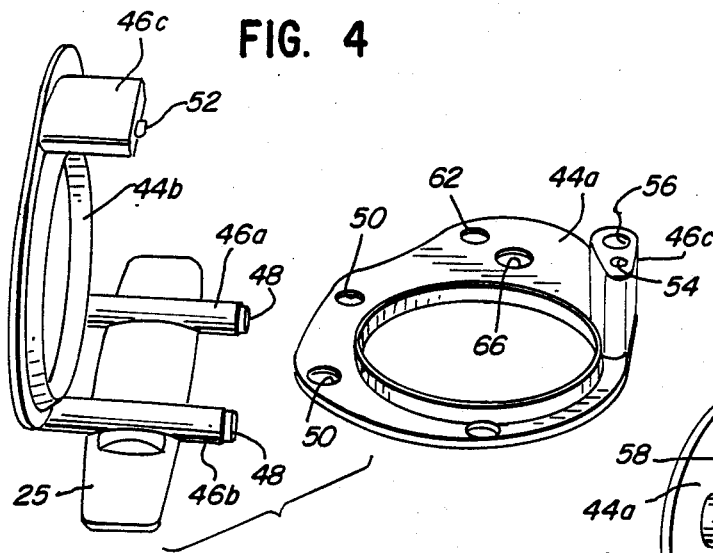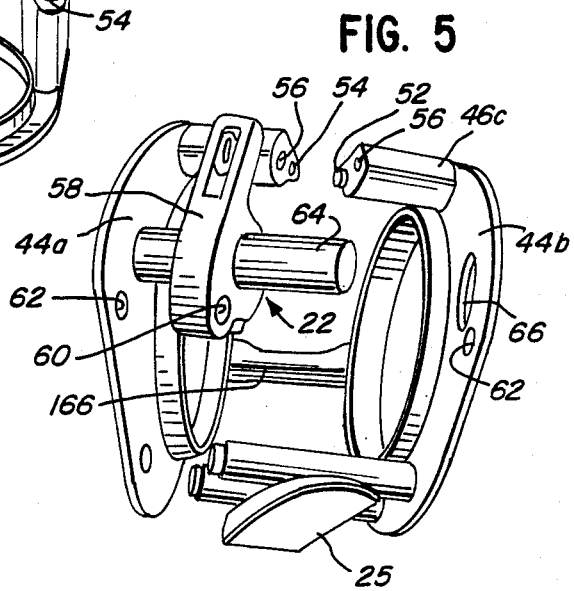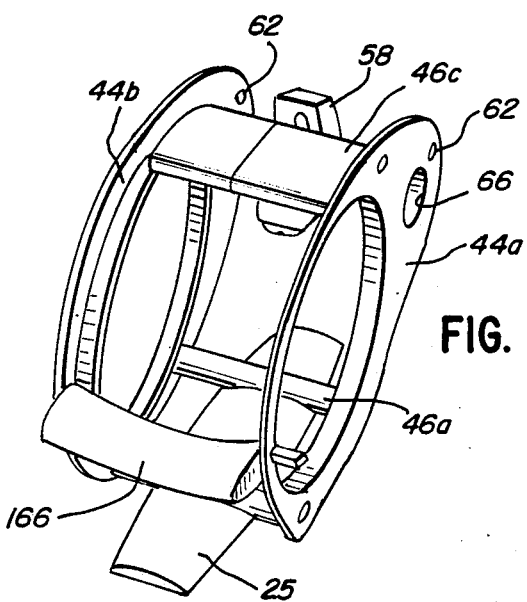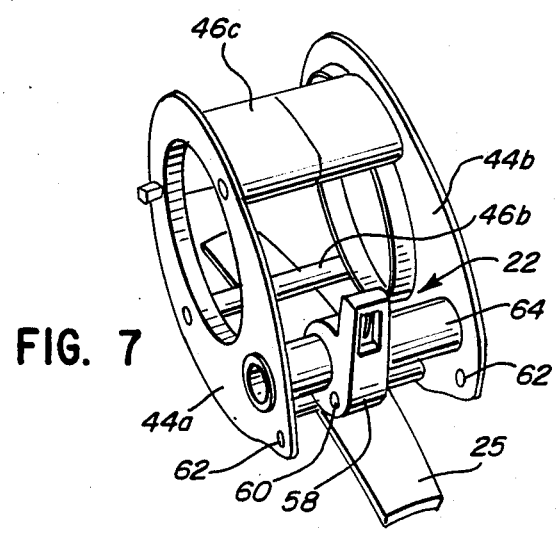

BAIT CASTING FISHING REEL

This is a division of application Ser. No. 757,521, filed July 22, 1985, now abandoned.

BACKGROUND OF THE INVENTION

This invention relates to fishing reels and, particularly to fishing reels of the casting type.

Casting type fishing reels normally include a spool having a spool axis extending in a transverse direction normal to the fishing line and the casting rod. A frame is disposed about the area of the spool shaft and normally includes a pair of side frame members or plates having spacer posts extending transversely therebetween. One or more side covers are positioned about the outside of the side frame plates and house operative components of the reel, such as a gear train, drag mechanism, anti reverse ratchet mechanism and the like. A handle is disposed on the outside of one of the side covers, normally the right side cover, and is connected through a crank shaft assembly to the gear train. A level wind mechanism is provided for traversing the spool during winding of the fishing line thereon.

Casting reels generally have more operative components on the inside thereof and are more prone to line backlash than are fishing reels of the spinning or spincast type. Consequently, operators have more opportunities to disassemble and reassemble casting reels to gain access to the interior components thereof for adjustment, cleaning and the like. A constant effort is made to fabricate casting reels with operative features that are easy to operate, disassemble, and adjust by a fisherman. This invention is directed to various novel features of construction which are directed to the needs of the operator.

SUMMARY OF THE INVENTION

An object, therefore, of the invention is to provide a casting type fishing reel with various operative features which render the reel easy to operate, adjust, assemble and reassemble, and in a trouble-free construction.

In the exemplary embodiment of the invention, the reel includes a spool having a transverse spool shaft, with a frame about the area of the spool. The frame includes a pair of side frame plates, with spacer post means extending transversely between the side plates outside the bounds of the spool. Complementary interengaging means are provided between the spacer post means and at least one of the side frame plates to maintain the frame plates in conjoint alignment and to provide for easy separation and assembly of the frame plates.

The reel includes a pair of side cup-shaped cover members positioned over the side frame plates for housing various operative components of the reel. One of the side covers, such as the right-hand cover, houses the gear train and clutch mechanism of the invention. The other cover, such as the left-hand cover, houses a magnetic drag for the spool. A feature of the invention is a structure in which the gear train means are rotatably mounted directly on the inside of the respective side cover for operatively engaging a pinion gear to rotate the spool. Handle means are rotatably mounted on the outside of the side cover for rotating the gear train means. Therefore, the side cover can be removed from the reel for access to the gear train means without removing the handle and its operative components. A crank shaft extends through the cover and conjointly rotatably connects the handle means and the gear train means in operative position on opposite sides of the side cover. Furthermore, an anti-reverse ratchet gear is provided in the gear train means, and a pawl is mounted directly on the inside of the side cover for engaging the ratchet gear to prevent reverse rotation of the handle means. Consequently, the cover can be removed for access to the antireverse mechanism of the reel without removing the handle means.

The side covers and the side plates are maintained in assembly by a plurality of bolt-like retainer members transversely spanning the spool outside the bounds of the spool to hold the reel in assembly. One of the bolt-like retainer members extends through a through hole in a line guide of the level wind mechanism for guiding the mechanism in its traversing travel.

A mounting or support plate is sandwiched between the right-hand cover and the right-hand frame plate for mounting the pinion gear means operatively associated with the spool shaft as well as clutch means for moving the pinion gear between a first position for rotating the spool shaft and a second position for rotating free of the spool shaft. A carrier plate is connected to the pinion gear means for carrying the pinion gear between its operative and inoperative positions. The clutch means includes a clutch plate slidably mounted for axially camming the carrier plate and the pinion gear means from the first position to the second position. A cam lever is pivotally mounted for engaging the clutch plate, and an actuator lever is pivotally mounted for engaging the cam lever. The actuator lever is in the form of a bell crank with one portion engaging the cam lever and the other portion exposed exteriorly of the side cover for manual manipulation.

The reel includes a magnetic drag mechanism mounted within the other cover member, i.e. the left-hand cover. Specifically, the side cover has a substantially flush exterior face with a circular recess formed therein. A manually rotatable dial is positioned within the cover recess and has an exterior face generally flush with the exterior face of the cover. The side cover has a peripheral cut-out in communication with the recess and through which a peripheral portion of the dial is exposed for manual rotation. The dial is operatively associated with an axially movable carrier mounted within the cover for moving a plurality of permanent magnets back and forth in an axial direction.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a casting type fishing reel in accordance with the invention;

FIG. 2 is a perspective view in a reverse direction from that of FIG. 1, with an exploded presentation of the components of the handle means;

FIG. 3 is a partially exploded perspective view of the reel, illustrating the spool, spool shaft and interior split frame;

FIG. 4 is a perspective view of the two components of the split frame;

FIG. 5 is a perspective view of the split frame about to be assembled;

FIG. 6 is a perspective view of the split frame assembled;

FIG. 7 is a perspective view of the split frame reversed from than of FIG. 6;

DETAILED DESCRIPTION OF THE PREFERRED EMBODIMENT

Figure 8:
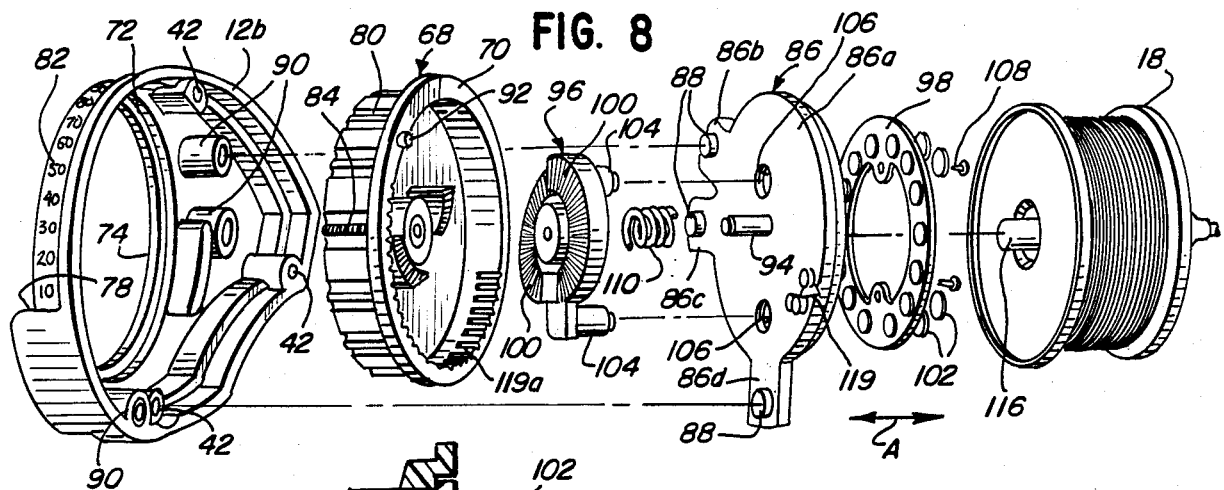
FIG. 8 is an exploded perspective view of the left-hand cover member and the components of the magnetic drag housed therewith.

Referring to the drawings in greater detail, and first to FIG. 1, a casting type fishing reel is disclosed and generally 10. The reel includes a housing defined by a pair of side covers 12a and 12b, and an interior split frame, generally designated 14 and described in greater detail hereinafter. A handle 16 is rotatably mounted on the outside of cover 12a for rotating a spool 18 to retrieve fishing line 20. A level wind mechanism, generally designated 22, is provided for traversing spool 18 during winding the fishing line thereon. A magnetic drag mechanism, generally designated 24, is mounted within and partially exposed through cover 12b. A shoe 25 is provided on split frame 14 for attaching the reel to a fishing rod. The casting reel is illustrated herein as a right-hand operative fishing reel and, therefore, various components may be described herein as a right or right-hand component and a left or left-hand component for simplicity and clarity purposes. For instance, cover 12a may be described as the right-hand cover and cover 12b may be described as the left-hand cover.

FIG. 2 illustrates reel 10 and the various components of the handle and crank means, including handle 16. The handle includes a rectangular hole 26 which is shaped complimentary to a rectangularly shaped distal end of a crank shaft 28 for rotating the crank shaft and, therefore, the spool and other operative components of the reel. The distal end of the crank shaft is externally threaded for receiving a nut 30 for securing the handle to the distal end of the crank shaft. A shoulder 32 is formed on the crank shaft for axially positioning the handle at the distal end thereof. A cap 34 is positionable over nut 30 and has an inside socket (not shown) matching the hexagonal configuration of the nut. The cap is mounted on the handle and prevented from rotation by a screw 36. Therefore, once nut 30 is tightened onto the distal end of crank shaft 28, cap 34 prevents the nut from loosening the handle.

FIG. 3 shows spool 18 having a transverse spool shaft 38 extending generally centrally between side covers 12a, 12b and through the center of split frame 14. The reel is held in assembly by a plurality of bolt-like retainers 40 positioned through appropriate holes in right-hand cover 12a and threaded into internally threaded bores 42 on the inside of left-hand cover 12b. Therefore, as seen in FIG. 1, there are no exterior nuts on the outside of cover 12b for securing the bolts. The bolts extend through interior split frame 14, as will be seen in greater detail hereinafter.

Referring to FIGS. 4–7, interior frame 14 is "split" to provide for easy assembly and disassembly of the frame 14. The two halves of the split frame when assembled may be staked together into a single frame or may be separable to gain easy access to the spool and line area within the frame. More particularly, the split frame includes a pair of side frame plates 44a and 44b. A plurality of spacer posts 46a, 46b and 46c extend transversely between side frame plates 44a, 44b outside the bounds of the spool area. Complementary interengaging means are provided between the spacer posts and at least one of the side frame plates to maintain the frame plates in conjoint alignment and to provide for easy separation and assembly of the plates. More particularly, lower spacer posts 46a, 46b have reduced diameter distal ends 48 for positioning within similarly sized holes 50 in side plate 44a. This interengagement provides for proper conjoint alignment of the side plates, and the shoulders on spacer posts 46a, 46b defined by reduced diameter portions 48 abut against the inside face of side plate 44a to properly space the side plates. Upper post 46c is split intermediate its ends and includes a boss 52 formed on the inside face of the left-hand post portion for receipt within a complimentarily shaped hole 54 in the right-hand post portion. This interengagement also facilitates conjoint alignment and proper spacing of side plates 44a, 44b.

Viewing FIGS. 4–7 in conjunction with FIG. 3, it can be seen that one bolt 40 extends through spacer post 46b, another bolt 40 extends through a bore 56 through split post 46c. In addition, level wind mechanism 22 includes a traversing line guide 58 which has a through hole 60, and the third bolt 40 extends therethrough for guiding the line guide in its traversing travel. The third bolt also extends through holes 62 in side plates 44a, 44b, the holes 62 in the side plate being in alignment with hole 60 in line guide 58. Lastly, level wind mechanism 22 includes a cylindrical housing 64 for receiving a conventional double grooved shaft which effects traversing of line guide 58. The cylindrical housing is located by means of enlarged holes 66 formed in side plates 44a, 44b.

Figure 9A:
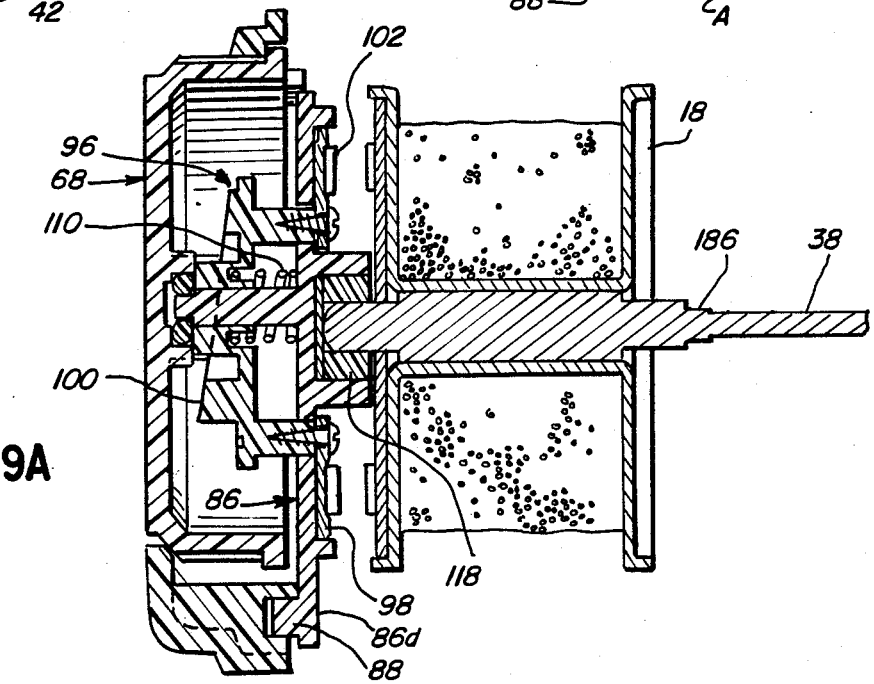
FIGS. 9A and 9B are central sectional views showing the components of the magnet drag of FIG. 8 in different axial positions.
Figure 9B:
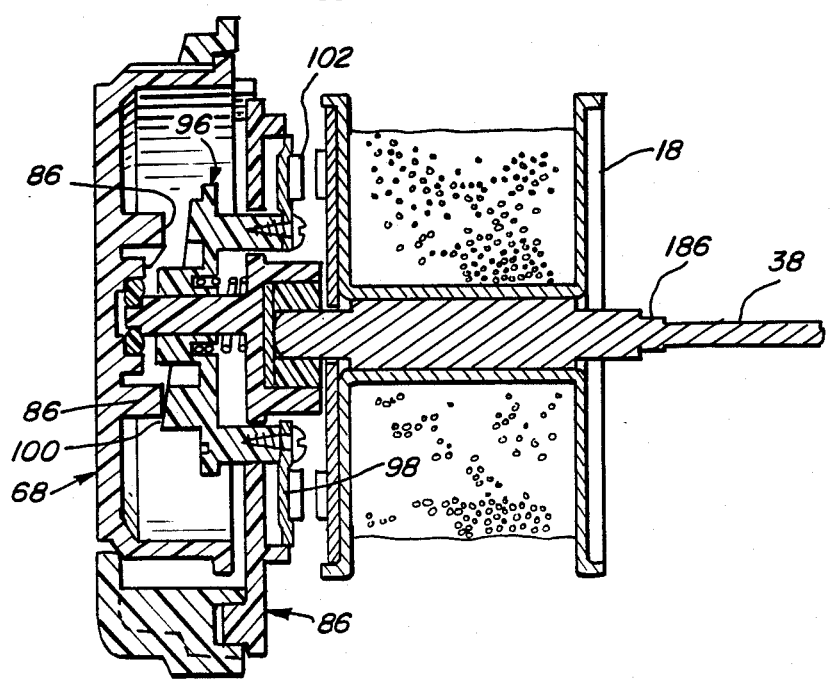

FIGS. 8–9B show the components and operation of the magnetic drag mechanism of the invention which is uniquely recessed within the left-hand cover 12b. More particularly, a cup-shaped dial, generally designated 68, is rotatably mounted within side cover 12b by means of engagement between a radially projecting annular flange 70 on the dial which is seated in an annular shoulder 72 formed on the inside of cover 12b about a circular recess 74. As can be seen best in FIG. 1, the cover has a substantially flush exterior face with circular recess 74 formed therein Dial 68 has an exterior face 76 which lies flush with the exterior face of the side cover to provide a clean appearance and a profile void of projections which are objectionable for easy grasping and control of the reel. The side cover has a peripheral cut-out area 78 in communication with recess 74 and through which a peripheral portion of dial 68 is exposed for manual rotation. The outer periphery of the dial is serrated, as at 80 (FIG. 8), to facilitate rotation of the dial. Indicia or calibration means 82 are provided on cover 12b along the cut-out portion for alignment with a calibration line 84 on dial 68 to provide indicia means for the extent of drag adjustment. Cam ramps 86 are formed integrally with the inside of cup-shaped dial 68 for purposes described below.

A support plate, generally designated 86, has a disc-shaped portion 86a which fits adjacent surface 70 of cup-shaped dial 68. The support plate has a plurality of ears 86b, 86c and 86d projecting outwardly from disc portion 86a. The ears have outside projections 88 which are positioned within complementary bores in bosses 90 formed on the inside of cover 12b to properly position and prevent relative rotation of the support plate. Dial 68 has a projection 92 on the inside of flange 70 for abutting against ears 86b and 86d to define stop limits for rotation of the dial. The support plate also has an outwardly projecting pilot shaft 94.

A cam disc, generally designated 96, is positioned on the outside of support plate 86 and a magnet carrier ring 98 is positioned on the inside of the support plate. The cam disc has cam ramps 100 for engaging cams 86 on the inside of dial 68. Carrier ring 98 carries a plurality of permanent magnets 102 positioned in a circular pattern around the ring. Cam disc 96 is located over pilot shaft 94 of support plate 86 and has a plurality of stub shafts 104 extending through apertures 106 in the support plate for securing to the magnet carrier ring by means of bolts 108 threaded into stub shafts 104. Therefore, cam disc 96 and magnet carrier ring 98 are axially movable in the direction of double-headed arrow "A" (FIG. 8) relative to and on opposite sides of fixed support plate 86. A coil spring 110 surrounds pilot shaft 94 and is sandwiched between cam disc 96 and support plate 86 to bias the cam disc and magnet carrier axially outwardly to maintain engagement between cam ramps 100 and cams 86.

The left-hand end of a spool shaft 116 abuts within a socket 118 (FIGS. 9A and 9B) of support plate 86 to axially fix the position of the spool. Therefore, cam disc 96 and magnet carrier ring 98 move axially relative to the spool and thereby move magnets 102 toward and away from the spool to vary the magnetic field therebetween and thereby vary the drag on the spool, all in response to rotation of dial 68. FIG. 9A shows the cam disc and magnet carrier ring in their extreme outer or separated position. FIG. 9B shows the cam disc and carrier ring moved axially inwardly to close the gap between magnets 102 and spool 18. A "clicker" spring 119 (FIG. 8) engages serrations 119a on the inside of dial 68 to provide an audible indication of rotating the dial.

Figure 10:
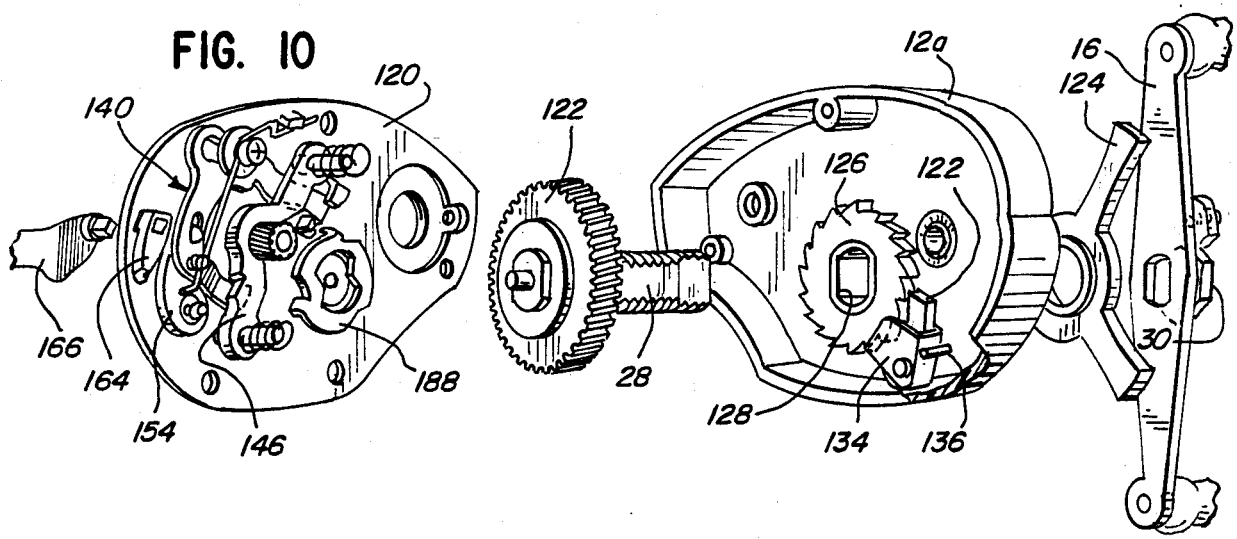
FIG. 10 is an exploded perspective view of the components of the reel which are mounted on the righthand cover member, as well as the clutch support plate mounted within the cover member.
Figure 11:
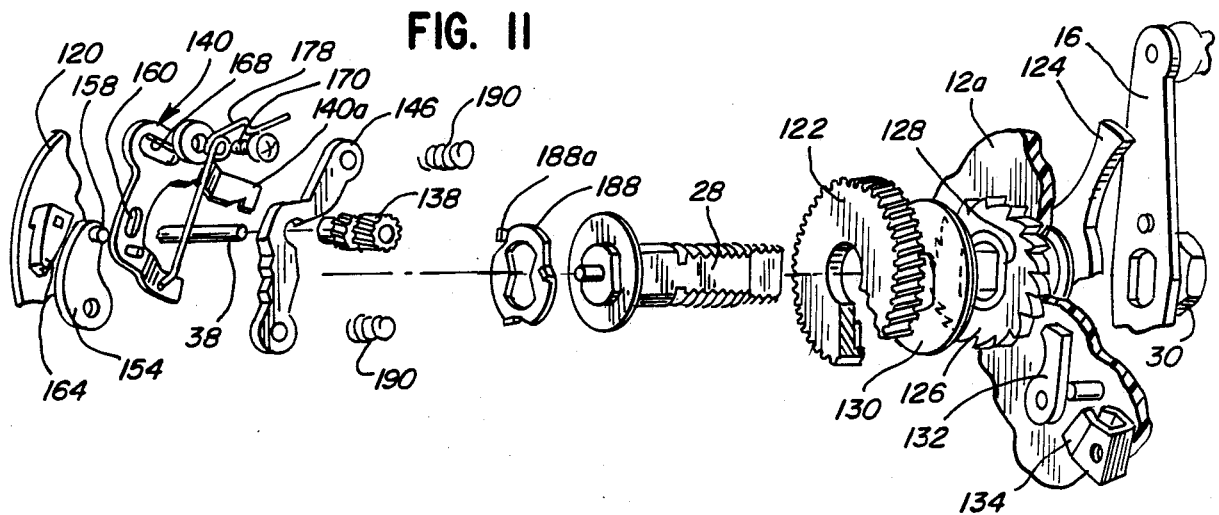
FIG. 11 is a still further exploded perspective view of most of the components shown in FIG. 10.

FIGS. 10 and 11 show the feature of the invention wherein the handle means and main gear train means are mounted on opposite sides of right-hand cover 12a to form a composite assembly which may be disassembled from the reel to gain access to the gear train and other interior components without having to remove the handle. For instance, as will be described in greater detail, an interior support plate 120 mounts the spool pinion gear and clutch mechanism to which access may have to be gained for repair or adjustment. More particularly, a main gear 122 is fixed to the inner end of crank shaft 28 inside cover 12a. The crank shaft extends through the cover for rotation relative thereto. Handle 16 is secured to the outer distal end of the crank shaft as described in relation to FIG. 2. A star wheel nut 124 is threaded onto the crank shaft on the outside of cover 12a to hold the crank shaft and main gear 122 in assembly on the cover. Therefore, it can be seen that the handle itself can be removed from the cover without the crank shaft and main gear being disassembled.

Figure 12A:
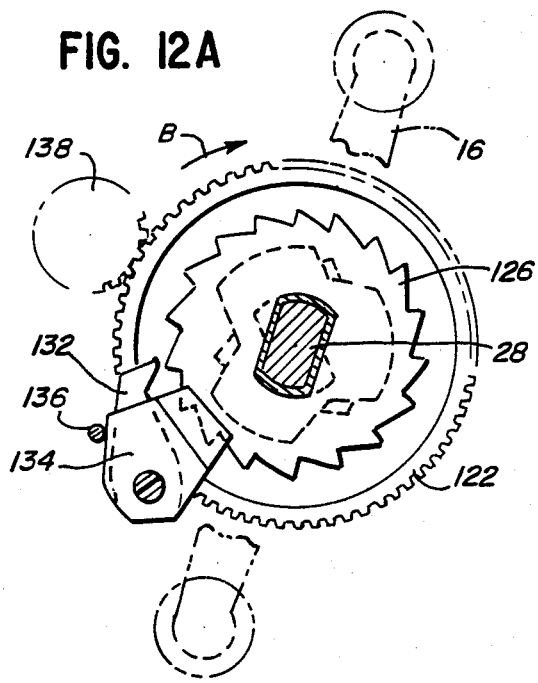
FIGS. 12A and 12B are isolated elevational views, on an enlarged scale, illustrating the disengaged and the engaged positions, respectively, of the antireverse ratchet-pawl mechanism.
Figure 12B:
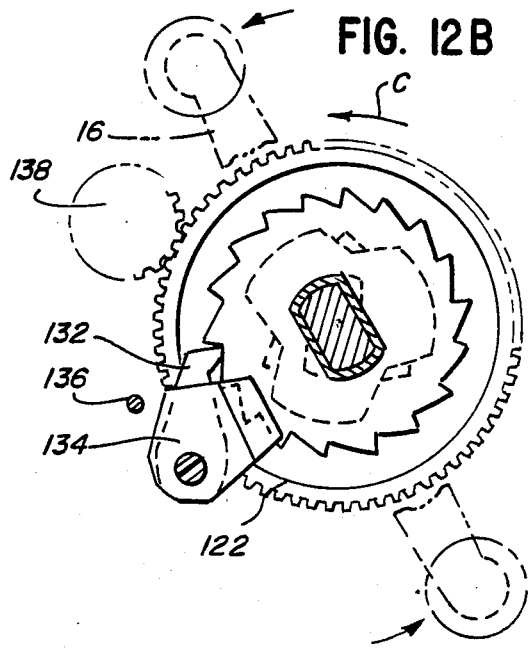
Figure 13A:
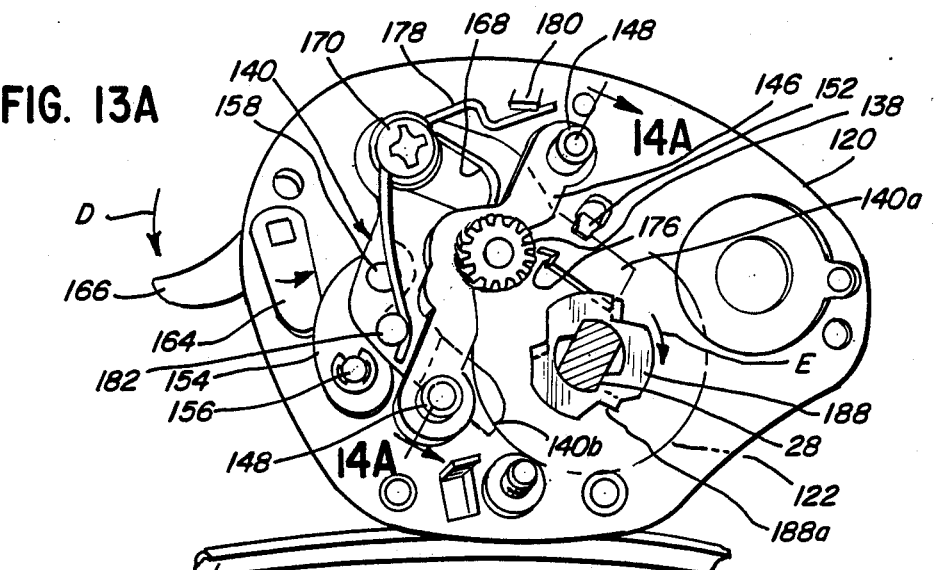
FIGS. 13A and 13B are isolated elevational views of the disengaged and the engaged positions, respectively, of the pinion gear and clutch mechanism.
Figure 13B:
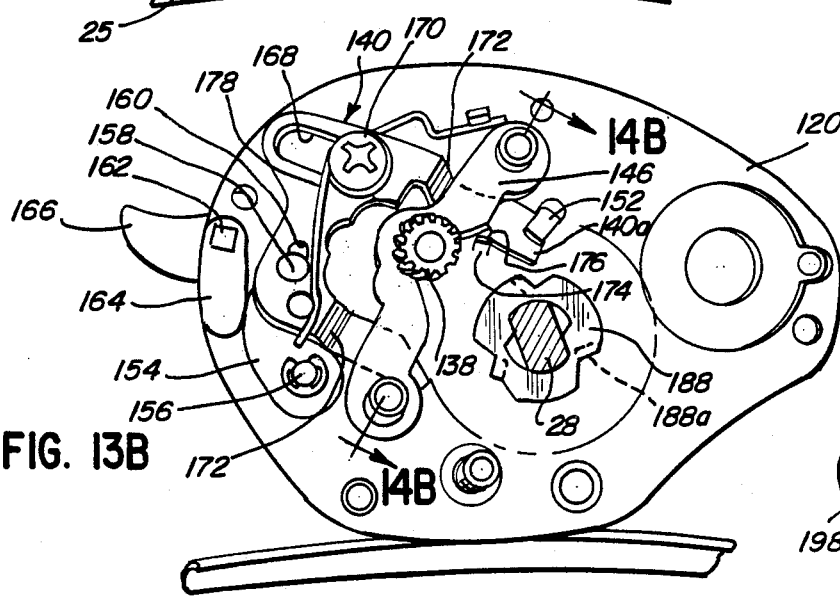

FIGS. 10 and 11, along with FIGS. 12A and 12B, also show an anti-reverse ratchet mechanism mounted on cover 12a for preventing reverse rotation of handle 16. In essence, the anti-reverse ratchet mechanism becomes part of the unitary assembly with cover 12a which can be removed from the reel to gain access to the interior components. More particularly, a ratchet gear 126 has a keyed opening 128 complementary to the shape of crank shaft 28 for conjoint rotation therewith. The ratchet gear is positioned immediately on the inside of cover 12a. A washer 130 (FIG. 11) is sandwiched between main gear 122 and ratchet gear 128. A pawl 132 is pivotally mounted on the inside of cover 12a for engaging the teeth of ratchet gear 126. A spring yoke 134 embraces pawl 132 and grips the sides of ratchet gear 126. Therefore, as handle 16 is rotated in its normal clockwise rotation as shown by arrow "B" in FIG. 12A, pawl 132 will be lifted off of the ratchet teeth by the gripping effect of spring yoke 134 onto the sides of the rotating ratchet gear. A stop pin 136 is formed integrally with and projects from the inside of cover 12a to provide a stop limit for pivoting movement of the pawl and the spring yoke. Upon attempted reverse rotation of handle 16 in a counterclockwise direction or the direction indicated by arrow "C" in FIG. 12B, the pawl will be pivoted into engagement with the ratchet gear due to the gripping effect of the spring yoke onto the ratchet gear as the gear rotates in the reverse direction.

Referring to FIG. 13A-14B, clutch means are provided for selective actuation to disengage a spool pinion gear 138 from spool shaft 38 to permit the spool to free-wheel during casting, and to automatically reengage the pinion gear with the spool shaft immediately in response to initial rotation of handle 16 to retrieve the fishing line. More particularly, a generally U-shaped clutch plate, generally designated 140, is slidably mounted on support plate 120. A carrier plate 146 is mounted on a pair of posts 148 formed integrally with and projecting axially from support plate 120, whereby the carrier plate is movable generally perpendicular to sliding clutch plate 140 and support plate 120 in a direction axially of the spool shaft. Carrier plate 146 seats within an annular recess 150 (FIGS. 14A and 14B) in pinion gear 138 for axially moving the gear with the carrier plate. U-shaped clutch plate 140 has a pair of legs 140a and 140b which are positioned between lower post 148 and a tab 152 stamped out of support plate 120 for guiding reciprocal sliding movement of the clutch plate. A cam lever 154 is pivoted at 156 to support plate 120. The free pivoting end of cam lever 154 has a pin 158 which moves within a lost-motion slot 160 formed in clutch plate 140, the slot extending generally perpendicular to the sliding direction of the clutch plate. An actuator in the form of a bell crank is pivoted at 162 to support plate 120. The actuator includes a first, lever portion 164 for freely engaging cam lever 154 for rotating the lever about its pivot axis 156 and, therefore, sliding clutch plate 140 radially inwardly. The actuator includes a second portion 166 projecting radially outwardly beyond the bounds of the reel for pushing in the direction of arrow "D" (FIG. 13A) to actuate the clutch mechanism. The clutch plate has an elongated lost-motion slot 168 which embraces a stationary post 170 formed integrally with and projecting from support plate 120. This further guides the radial sliding movement of the clutch plate. The clutch plate has a pair of cam ramps 172 (FIG. 13B) positioned on opposite sides of pinion gear 138 for engaging the underside of carrier plate 146 for lifting the carrier plate and axially moving the pinion gear out of engagement with flats 186 on spool shaft 38. Therefore, on depressing actuator portion 166 in the direction of arrow "D", lever portion 164 will engage cam lever 154 to pivot the cam lever and slide the clutch plate radially inwardly. This radially inward movement of the clutch plate lifts the carrier plate and disengages the pinion gear from the spool shaft.

Lock means are provide for holding the clutch mechanism in the position of disengaging the pinon gear with the spool shaft. The lock means include a lock tab 174 which seats behind a notch 176 in leg portion 140a of clutch plate 140. This is effected by a snap-action under the biasing of a double-arm spring rod 178. The spring arm is wrapped about post 170 and has one end anchored to a tab 180 stamped out of support plate 120. The opposite end of the spring arm engages behind a post 182 projecting outwardly from leg 140b of clutch plate 140. Consequently, there is a radially inward biasing force on leg 140a of the clutch plate to urge notch 176 into locking engagement with tab 174.

Figure 14A:
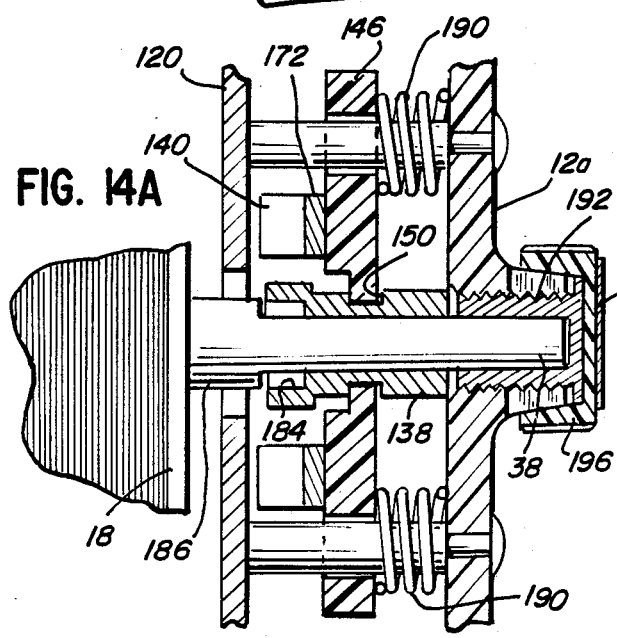
FIG. 14A is a fragmented section, on an enlarged scale, taken generally along line 14A–14A of FIG. 13A.
Figure 14B:
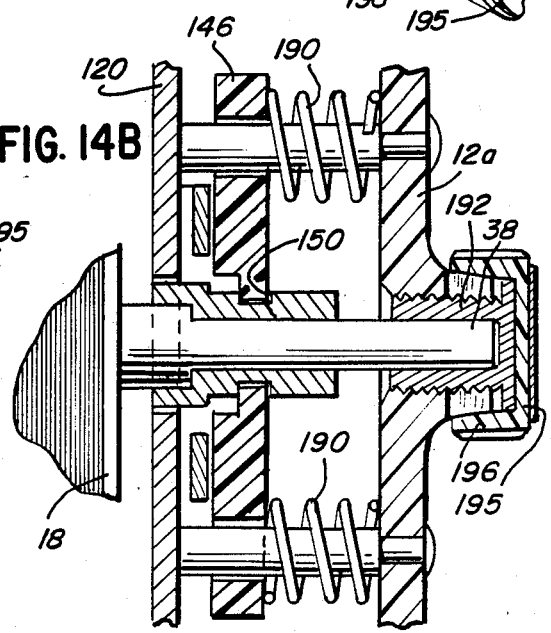
FIG. 14B is a fragmented section, on an enlarged scale, taken generally along line 14B—14B of FIG. 13A.

FIG. 14A shows pinion gear 138 in its disengaged position with the spool shaft as cam ramps 172 on clutch plate 140 lift carrier plate 146 to move the pinion gear. FIG. 14B shows the pinion gear in its axial position of engagement. To this end, pinion gear 138 has an irregularly shaped socket 184 which mates with a complementarily irregularly shaped enlarged portion 186 of spool shaft 38 to drive the spool shaft.

Means are provided for automatically actuating the clutch mechanism to return the pinion gear to its position of engagement with the spool shaft in response to rotation of the handle and the main gear. More particularly, a cam disc 188 (FIGS. 13A and 13B) has a plurality of tabs 188a which are engageable with leg 140a of clutch plate 140. The cam disc is keyed to crank shaft 28. Therefore, upon rotating the crank shaft in the direction of "E" (FIG. 13A), one of the tabs 188a will engage leg 140a to move notch 176 out of engagement with tab 174, whereby spring 178 will return clutch plate 140, cam lever 154 and actuator lever 164, 166 back to their inoperative positions. Coil springs 190 (FIGS. 14A and 14B) are sandwiched between carrier plate 146 and right-hand cover 12a to bias carrier plate 146 and pinion gear 138 automatically back to the position of engagement of the pinion gear upon return movement of the clutch plate back to its inoperative position. It can be seen in FIGS. 2 and 3 that actuator portion 166 actually comprises a transverse bar pivotally mounted between split frame plates 44a, 44b.

Figure 15:
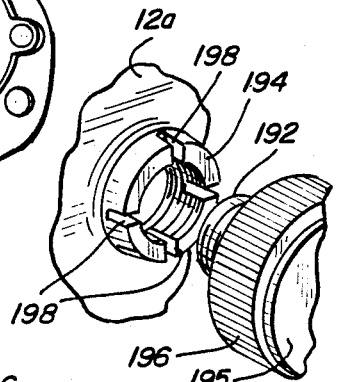
FIG. 15 is a fragmented perspective view of the hub bearing for the spool shaft and the interengaging friction means between the bearing and the side cover.

FIGS. 14A and 14B, along with FIG. 15, show a hub bearing 192 threaded into cover 12a for receiving and providing a pilot for spool shaft 38. Interengaging friction means are provided between the hub bearing and cover 12a for maintaining the hub bearing in a set threaded position and preventing the threads from backing off and loosening. Specifically, an annular boss 194 (FIG. 15) is formed integral with and projects outwardly from the outer face of cover 12a. The boss is internally threaded for receiving externally threaded hub bearing 192. The hub bearing has a cup-shaped cap 195 fixed to the outer end thereof to form an integral part of the bearing. The cap has a peripheral wall 196 directed axially inwardly to form wall means to partially hide and cover slots 198 in boss 194 to prohibit dirt from entering. The annular boss is split, as at 198, to provide self-contained resiliency. Therefore, as hub bearing 192 is threaded into side cover 12a, the resilience of the boss provides a friction fit on hub bearing 192 to prevent unnoticed or unintentional movement.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a fishing reel which includes a housing having side frame members, a spool having a transverse spool shaft extending between the side frame members of the housing, a frame about the area of the spool and independent of the housing comprising:

a pair of side frame plates;

spacer post means extending transversely between the side frame plates outside the bounds of the spool, said spacer post means including at least one first post member fixed at opposite ends to the side frame plates, said one post member having joinable portions intermediate its opposite ends, one said joinable portion having a boss and the other said joinable portion having a complementary hole for reception of said boss; and said spacer post means having at least a second post member, said second post member having a complementary interengaging means between the second post member and at least one of the side frame plates to maintain the frame plates in conjoint alignment and to provide for easy separation and assembly of the frame plates.

2. In a fishing reel as in claim 1 wherein said second post member includes at least one post member fixed at one end to one of the side frame plates and releasably positioned in receptacle means in the other side frame plate.

* * * * *